United States Patent
Chen (10) Patent No.: US 9,394,878 B2
(45) Date of Patent: Jul. 19, 2016

(54) POWER GENERATION APPARATUS USING WAVE ENERGY CONVERSION BY GRAVITY

(71) Applicant: Smart Energy Inc., Tainan (TW)

(72) Inventor: Shih-Hsiung Chen, Tainan (TW)

(73) Assignee: SMART ENERGY INC., Tainan (TW)

( * ) Notice: Subject to any disclaimer, the term of this patent is extended or adjusted under 35 U.S.C. 154(b) by 180 days.

(21) Appl. No.: 14/287,018

(22) Filed: May 24, 2014

(65) Prior Publication Data

US 2014/0353973 A1 Dec. 4, 2014

(30) Foreign Application Priority Data

May 28, 2013 (TW) .............................. 102209898 U (51) Int. Cl.
*F03B 13/22* (2006.01)
*F03B 13/20* (2006.01)

(52) U.S. Cl.
CPC ............ *F03B 13/20* (2013.01); *F05B 2260/506* (2013.01); *Y02E 10/38* (2013.01)

(58) Field of Classification Search
CPC ......... F03B 13/12; F03B 13/22; Y02E 10/38; Y02E 10/28; Y02E 10/32
USPC .............. 290/42, 43, 53, 54; 74/5.9, 5.95, 25; 60/398, 495–505; 417/30–33
See application file for complete search history.

(56) References Cited

U.S. PATENT DOCUMENTS

| | | | | |
|---|---|---|---|---|
| 4,266,143 A * | 5/1981 | Ng | ................................ | 290/53 |
| 4,288,986 A * | 9/1981 | Watson | ........................... | 60/501 |
| 4,317,046 A * | 2/1982 | Holmberg | ..................... | 290/1 R |
| 7,375,436 B1 * | 5/2008 | Goldin | ............................ | 290/42 |
| 8,310,114 B2 * | 11/2012 | Chang et al. | .................... | 310/47 |
| 2009/0008942 A1 * | 1/2009 | Clement et al. | ................. | 290/53 |
| 2009/0273188 A1 * | 11/2009 | McKinney | ..................... | 290/53 |
| 2010/0244451 A1 * | 9/2010 | Ahdoot | ........................... | 290/53 |
| 2011/0109174 A1 * | 5/2011 | Hunter | ............................ | 310/20 |
| 2011/0185719 A1 * | 8/2011 | Beane | ............................. | 60/497 |
| 2013/0106111 A1 * | 5/2013 | Stornes et al. | ................. | 290/53 |
| 2014/0132003 A1 * | 5/2014 | Hayashi et al. | ................. | 290/53 |

* cited by examiner

*Primary Examiner* — Tulsidas C Patel
*Assistant Examiner* — Sean Gugger
(74) *Attorney, Agent, or Firm* — Chun-Ming Shih; HDLS IPR Services (57) ABSTRACT

A power generation apparatus (1, 1*a*) using wave energy conversion by gravity includes a sealed body (10, 10*a*), a rotor (20, 20*a*), a gear box (30,30*a*), a power generation motor (40, 40*a*), and a pontoon (50, 50*a*). The rotor (20, 20*a*), disposed in the sealed body (10, 10*a*), includes an eccentric disk (21, 21*a*), a plurality of rollers (22, 22*a*) and a rotating shaft (23, 23*a*) penetrating through the eccentric disk (21, 21*a*). A center of gravity of the eccentric disk (21, 21*a*) is disposed with an offset to that of the sealed body (10, 10*a*). The gear box (31) is driven by the rotating shaft (23, 23*a*). The power generation motor (40, 40*a*) is driven by the gear box (31) to rotate and generate electric power.

6 Claims, 8 Drawing Sheets

POWER GENERATION APPARATUS USING WAVE ENERGY CONVERSION BY GRAVITY

BACKGROUND OF THE INVENTION

1. Field of the Invention

The present invention relates to a power generation apparatus and, in particular, to a power generation apparatus using wave energy conversion by gravity.

2. Description of Related Art

Wave power generation is one renewable energy using marine energy, which is a clean, cheap, and safe power generation. According to the estimate of energy experts, if the less than 1% wave kinetic energy in the world is converted to electric energy, it will be sufficient to provide five-fold required energy for the world. Thus, the wave power generation is worth developing, especially for island countries which generate continuous wave caused by the monsoon. If the wave kinetic energy can be used with efficiency to generate power, it will be a considerable renewable energy.

A recent wave power generation technology is a wave power generation apparatus which converts wave kinetic energy into electric energy. The wave power generation apparatus which is fixed to a frame uses a retractable pump driven by a pontoon to produce gas which then drives an air impeller to generate electric power. However, the retractable pump and the frame are easily damaged by the impact of waves, and the electric power is not always generated constantly. Also, because the power generation apparatus is disposed in the seawater, damaged parts are difficult to repair. Moreover, the electric energy output is limited and thus there is no economic value for commercialization.

In view of this, the inventor pays special attention to research with the application of related theory and tries to overcome the above disadvantages regarding the above related art. Finally, the inventor proposes the invention which is a reasonable design and effectively overcomes the above disadvantages.

SUMMARY OF THE INVENTION

The present invention is to provide a power generation apparatus using wave energy conversion by gravity, which is disposed on the waves and uses the rotation of a rotor to drive a power generator motor to generate electric power.

The present invention provides a power generation apparatus using wave energy conversion by gravity. The power generation apparatus comprises a sealed body, a rotor, a gear box, a power generation motor, and a pontoon. The sealed body has a receiving space in which a track is disposed. The rotor is disposed in the receiving space and comprises an eccentric disk, a plurality of rollers, and a rotating shaft. A center of gravity of the eccentric disk is disposed with an offset to that of the sealed body. The rollers are mounted to the eccentric disk and disposed on the track. The rotating shaft penetrates through the eccentric disk. The gear box comprises at least one gear shaft driven by the rotating shaft to rotate. The power generation motor is driven by the at least one gear shaft to rotate and generate electric power. The pontoon is mounted to the outside of the sealed body.

The present invention also provides a power generation apparatus using wave energy conversion by gravity, which comprises a sealed body, a rotor, a gear box, and a power generation motor. The sealed body has a receiving space in which a track is disposed. The rotor is disposed in the receiving space and comprises an eccentric disk, a plurality of rollers, and a rotating shaft penetrating through the eccentric disk. A center of gravity of the eccentric disk is disposed at one side thereof. The rollers are mounted to the eccentric disk and can slide on the track. The gear box comprises a gear shaft driven by the rotating shaft. The power generation motor is driven by the gear shaft to rotate and generate electric power.

Compared with the prior art, the power generation apparatus using wave energy conversion by gravity of the present invention uses the rotor whose eccentric disk is rotated during wave undulation to drive the gear box and then the power generation motor to generate electric power. Therefore, the power generation efficiency is enhanced and the use of convenience and usability of the present invention are also improved.

DETAILED DESCRIPTION OF THE INVENTION

The detailed description and technical features regarding the present invention are provided below for reference with figures. However, the accompanying figures are only for reference and explanation, but not to limit the scope of the present invention.

Please refer to FIGS. 1-4, which are a perspective view of the power generation apparatus, a perspective view of the rotors, a horizontal and a vertical cross-sectional assembled views, respectively, of the power generation apparatus using wave energy conversion by gravity. The present invention provides a power generation apparatus 1 comprising a sealed body 10, a rotor 20, a gear box 30, a power generation motor 40, and a pontoon 50. In the current embodiment, the rotor 20, the gear box 30, and the power generation motor 40 are disposed in the sealed body 10. The pontoon 50 is mounted to the outside of the sealed body 10. The power generation apparatus 1 of the present invention is put into practice in waves; the pontoon 50 provides the power generation apparatus 1 with the required buoyancy.

Figure 1:
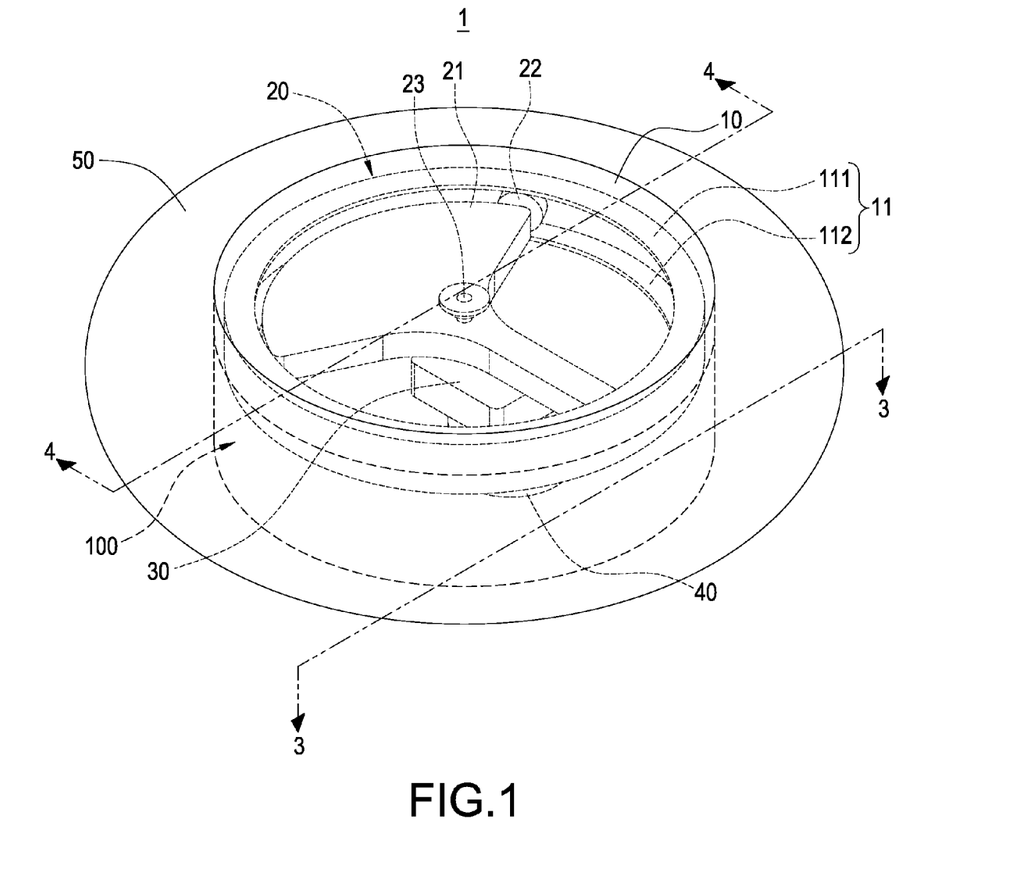
FIG. 1 is a perspective view of the power generation apparatus of the present invention.
Figure 3:
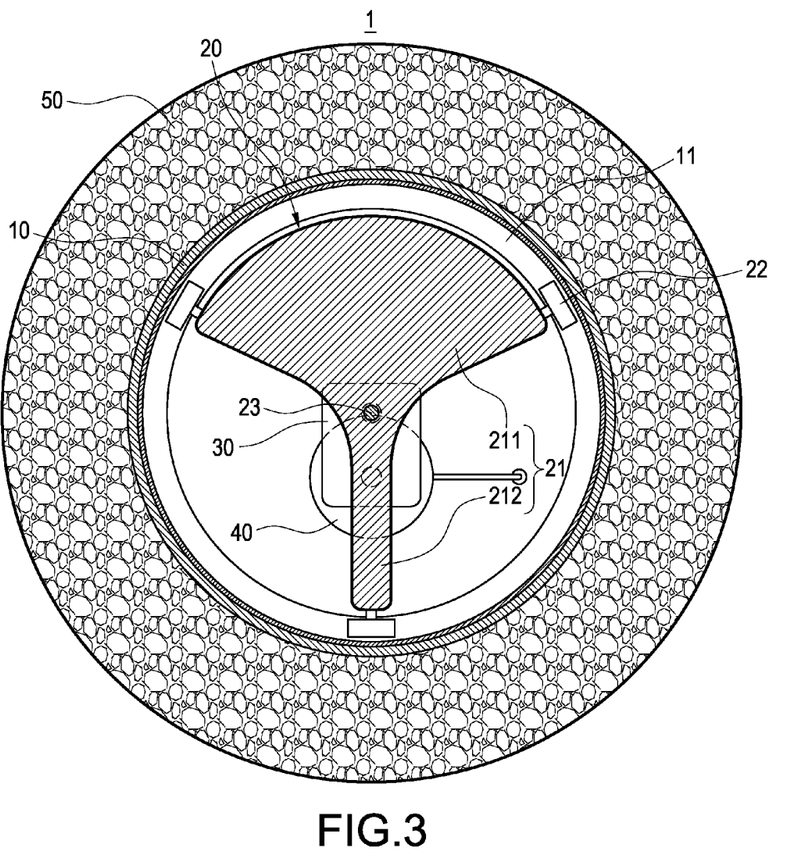
FIG. 3 is a horizontal cross-sectional assembled view of the power generation apparatus of the present invention.
Figure 4:
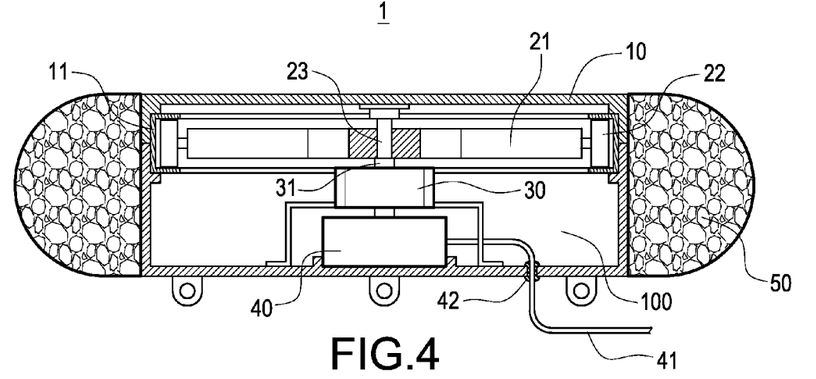
FIG. 4 is a vertical cross-sectional assembled view of the power generation apparatus of the present invention.

The sealed body 10 has a sealed receiving space 100 in which a track 11 is disposed. In one embodiment of the present invention, the sealed body 10 has a cylindrical shape. The track 11 has a ring shape and is disposed along an inner wall of the sealed body 10. Preferably, the track 11 comprises a first ring plate 111 and a second ring plate 112 opposite to the first ring plate 111 to form a ring track. However, in practice, the disposition of the track 11 is not limited as long as it can perform the required function.

Figure 2:
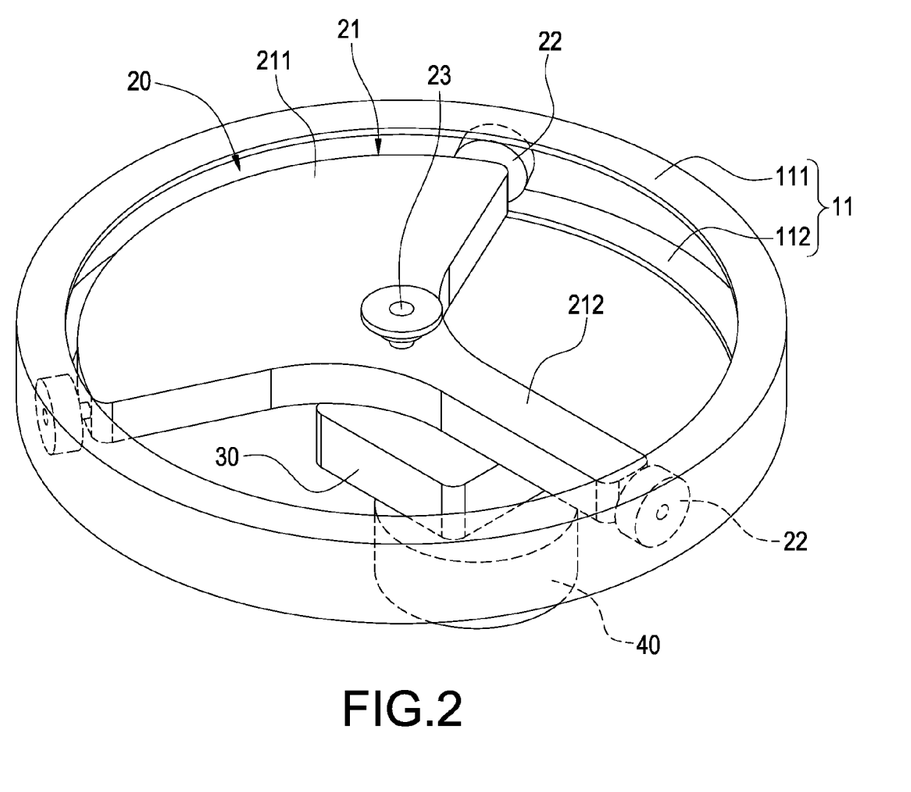
FIG. 2 is a perspective view of the rotor of the present invention.

The rotor 20 comprises an eccentric disk 21, a plurality of rollers 22, and a rotating shaft 23. The center of gravity of the eccentric disk 21 is disposed with an offset to that of the sealed body 10. The rollers 22 are mounted to the eccentric disk 21 and disposed on the track 11. The rotating shaft 23 penetrates through the eccentric disk 21. That is, the center of gravity of the eccentric disk 21 is disposed at one side thereof. The rollers 22 are mounted to the eccentric disk 21 and can slide on the track 11.

In the current embodiment, the eccentric disk 21 has a hammer shape and comprises a solid pate 211 and a strut 212 connected to the solid pate 211. The rotating shaft 23 is disposed axially at the joint of the solid pate 211 and the strut 212. Moreover, both sides of the rollers 22 contact against the first ring plate 111 and the second ring plate 112, respectively; the rollers 22 are spaced apart each other at the outer edge of the eccentric disk 21 and disposed between the first ring plate 111 and the second ring plate 112. The material of the eccentric disk 21 is not limited and may be concrete, metal or others when in practice.

The gear box 30 comprises at least one gear shaft 31 driven by the rotating shaft 23 to rotate. When in practice, the gear box 30 has a plurality of gears to form a gear set providing a required speed ratio. Also, the power generation motor 40 is driven by the gear shaft 31 to rotate and generate electric power. Thus, the electric power can be provided and further be stored. Preferably, the gear box 30 and the power generation motor 40 are received on one side of the eccentric disk 21 in the receiving space 100. Besides, the power generation motor 40 is connected to a power cable 41 passing through the sealed body 10 to the outside thereof for outputting the electric power. When in practice, the power cable 41 passes through the sealed body 10 and is combined with a sealing part 42 to provide a sealing function.

Figure 5:
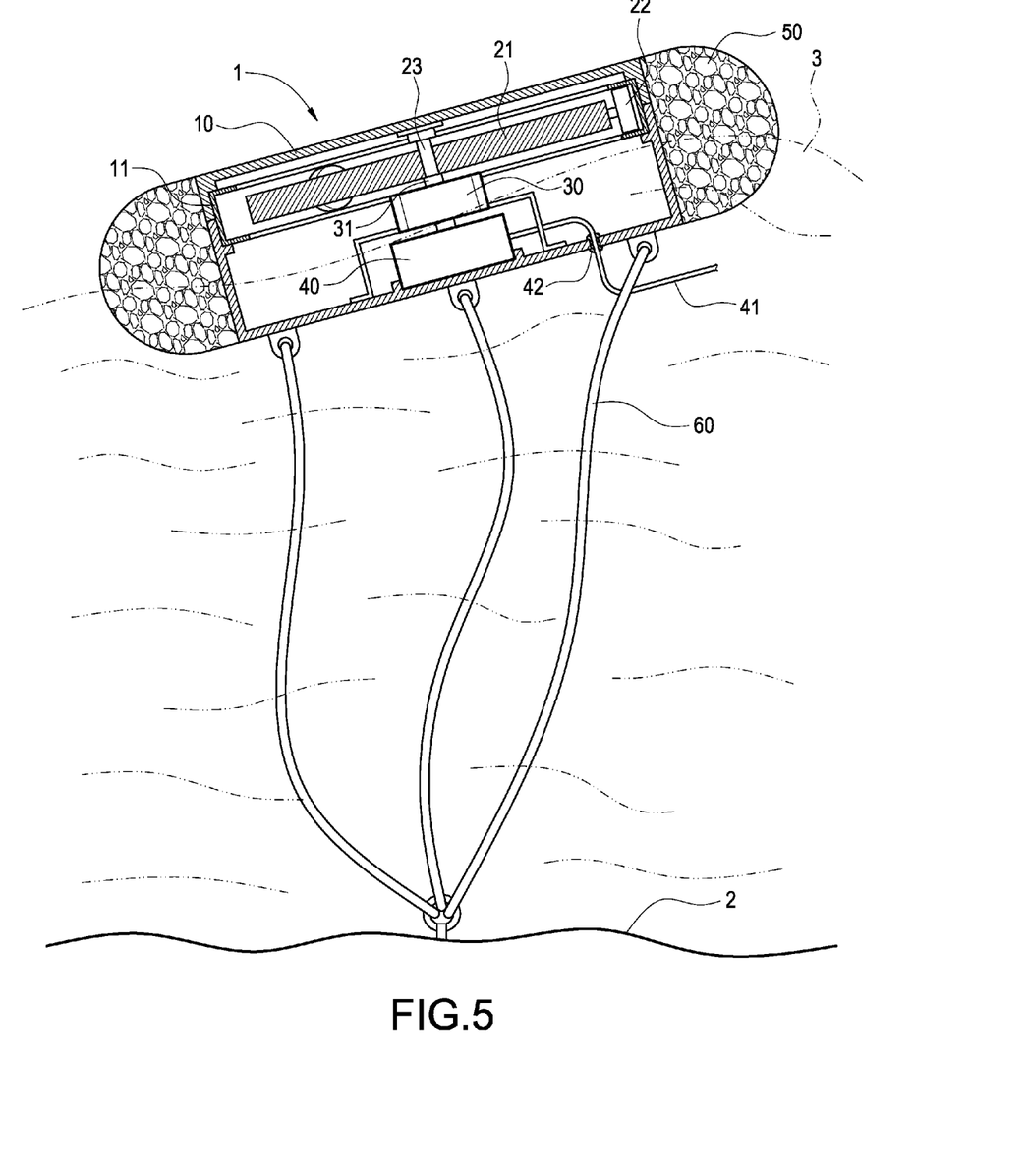
FIG. 5 is a schematic view of the power generation apparatus of the present invention in operation.
Figure 6:
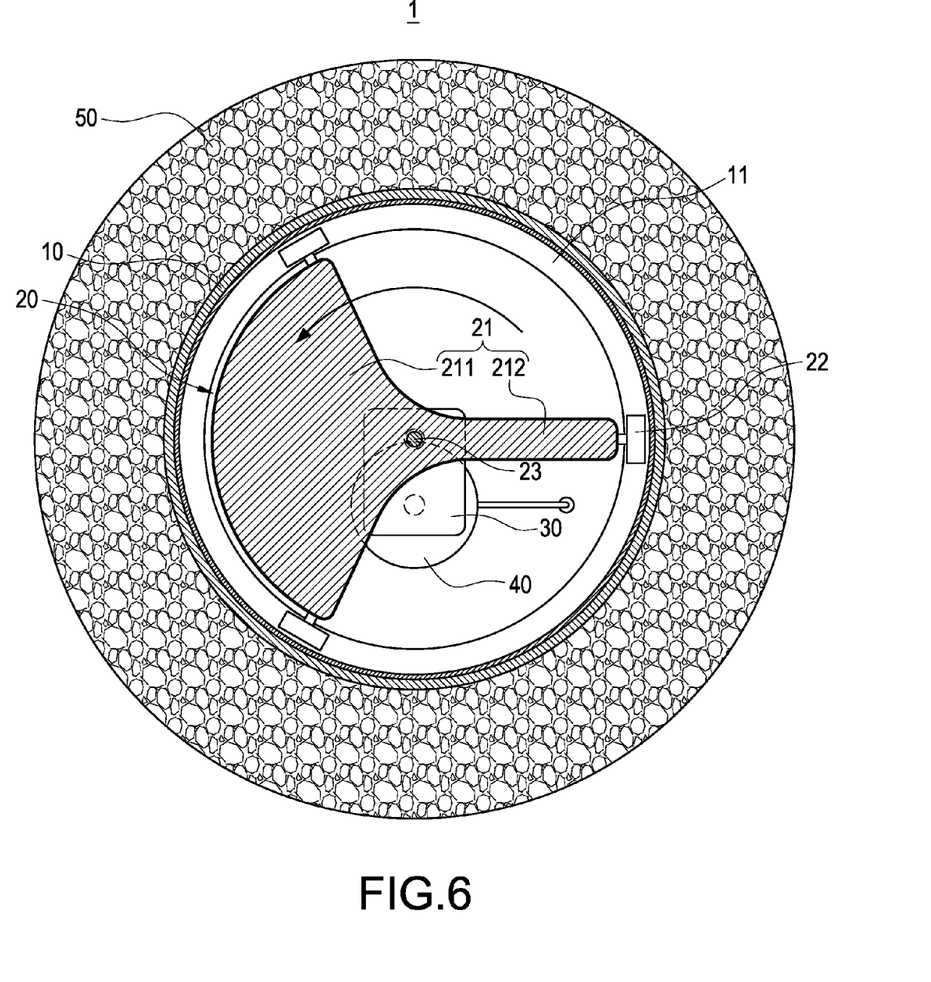
FIG. 6 is a schematic view of the rotor in rotation of the present invention.

Please refer to FIGS. 5 and 6, which are a schematic view of the power generation apparatus using wave energy conversion by gravity of the present invention in operation and a schematic view of the rotor in rotation, respectively. The power generation apparatus 1 further comprises a cable 60. One end of the cable 60 is mounted to a bottom surface of the sealed body 10. Thus, the power generation apparatus 1 can float on the sea. When the waves 3 are formed on the sea, the power generation apparatus 1 will move with the wave movement.

As shown in FIG. 6, when the power generation apparatus 1 moves with the movement of the wave 3, the eccentric disk 21 will rotate due to the biased center of gravity. At this time, the rotating shaft 23 is rotated to drive and rotate the gear shaft 31 of the gear box 3, causing the power generation motor 40 to generate electric power.

Figure 7:
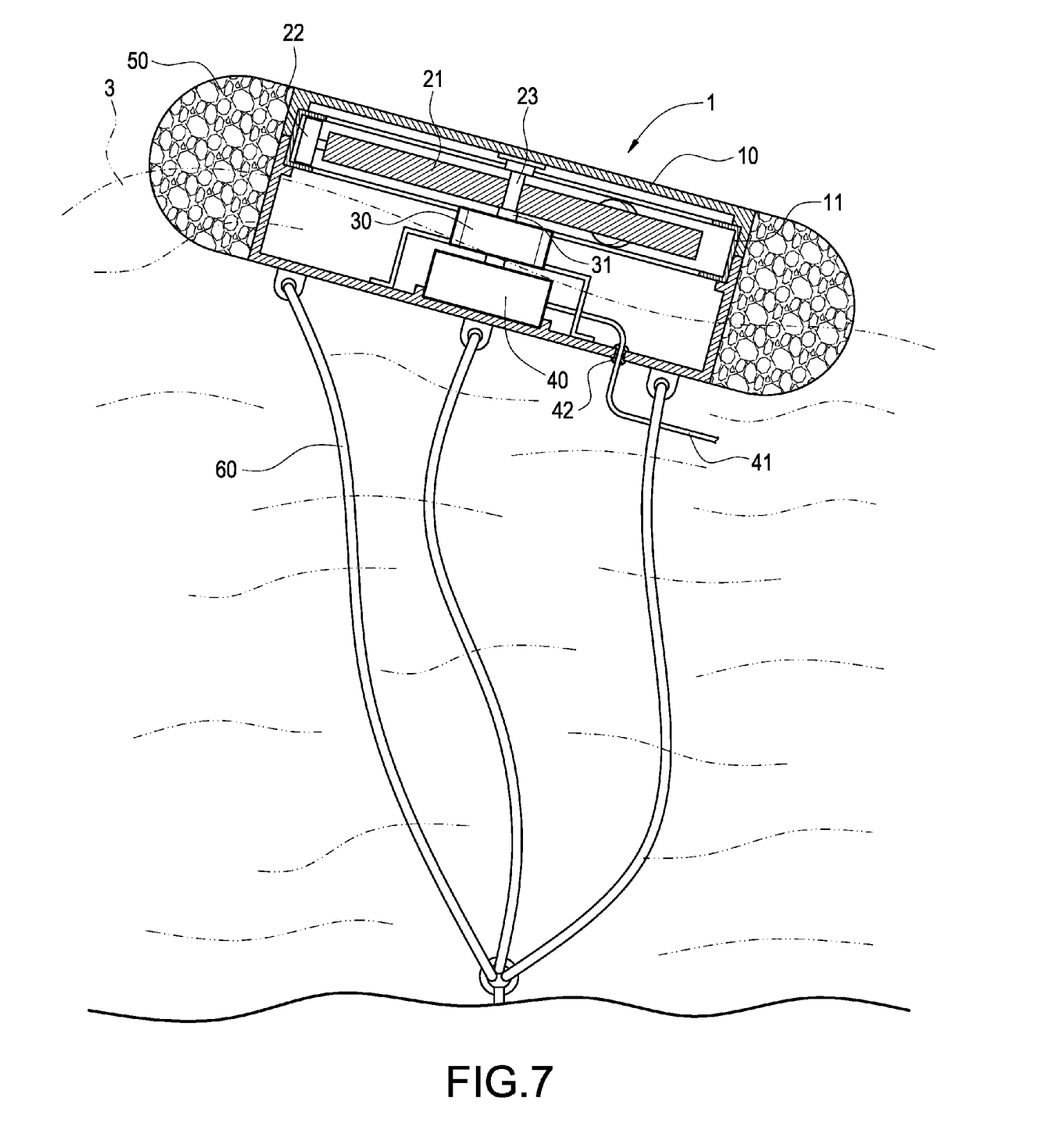
FIG. 7 is another schematic view of the power generation apparatus of the present invention in operation.
Figure 8:
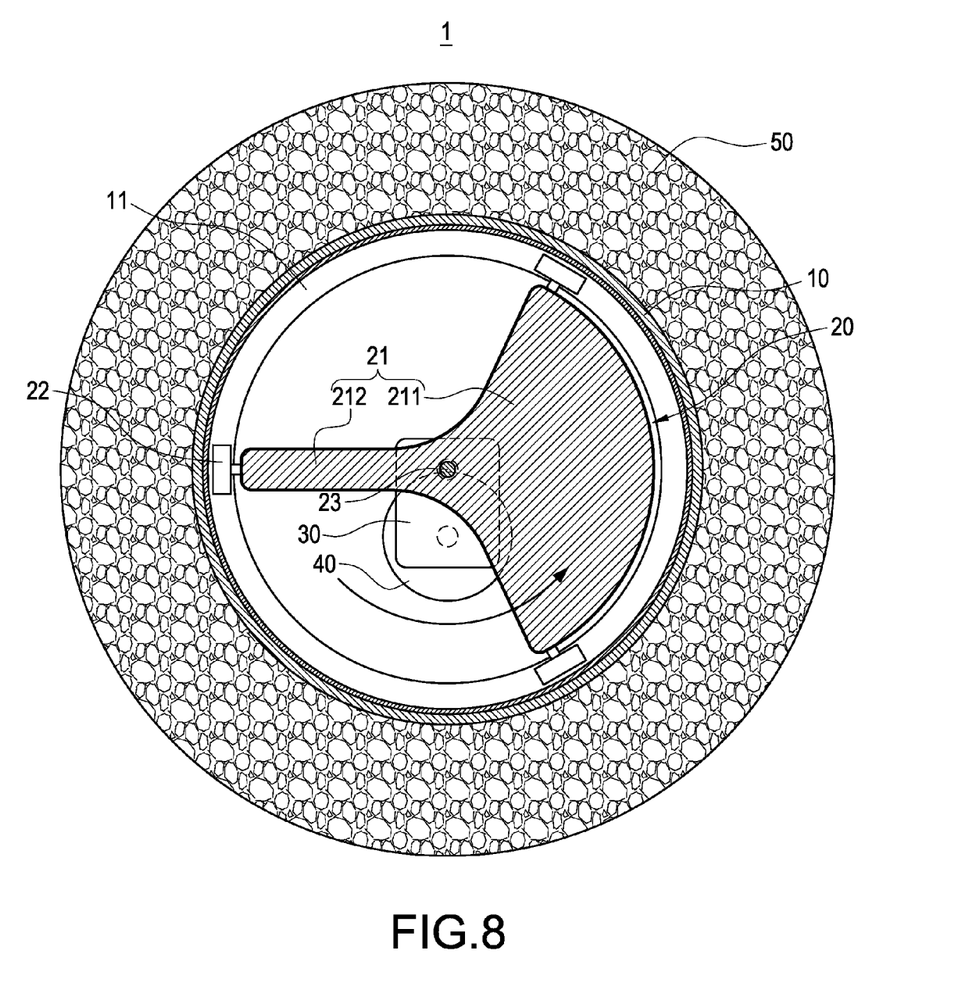
FIG. 8 is another schematic view of the rotor in rotation of the present invention.

Please continue to refer to FIGS. 7 and 8, which are another schematic view of the power generation apparatus using wave energy conversion by gravity of the present invention in operation and another schematic view of the rotor in rotation, respectively. When the power generation apparatus 1 moves with the movement of the wave 3, as shown in FIG. 8. Due to the biased center of gravity, the eccentric disk 21 continues rotating in the same direction and thus keeping the rotating shaft 23 rotating and driving the gear shaft 31 of the gear box 3, causing the power generation motor 40 to continuously generate electric power.

Figure 9:
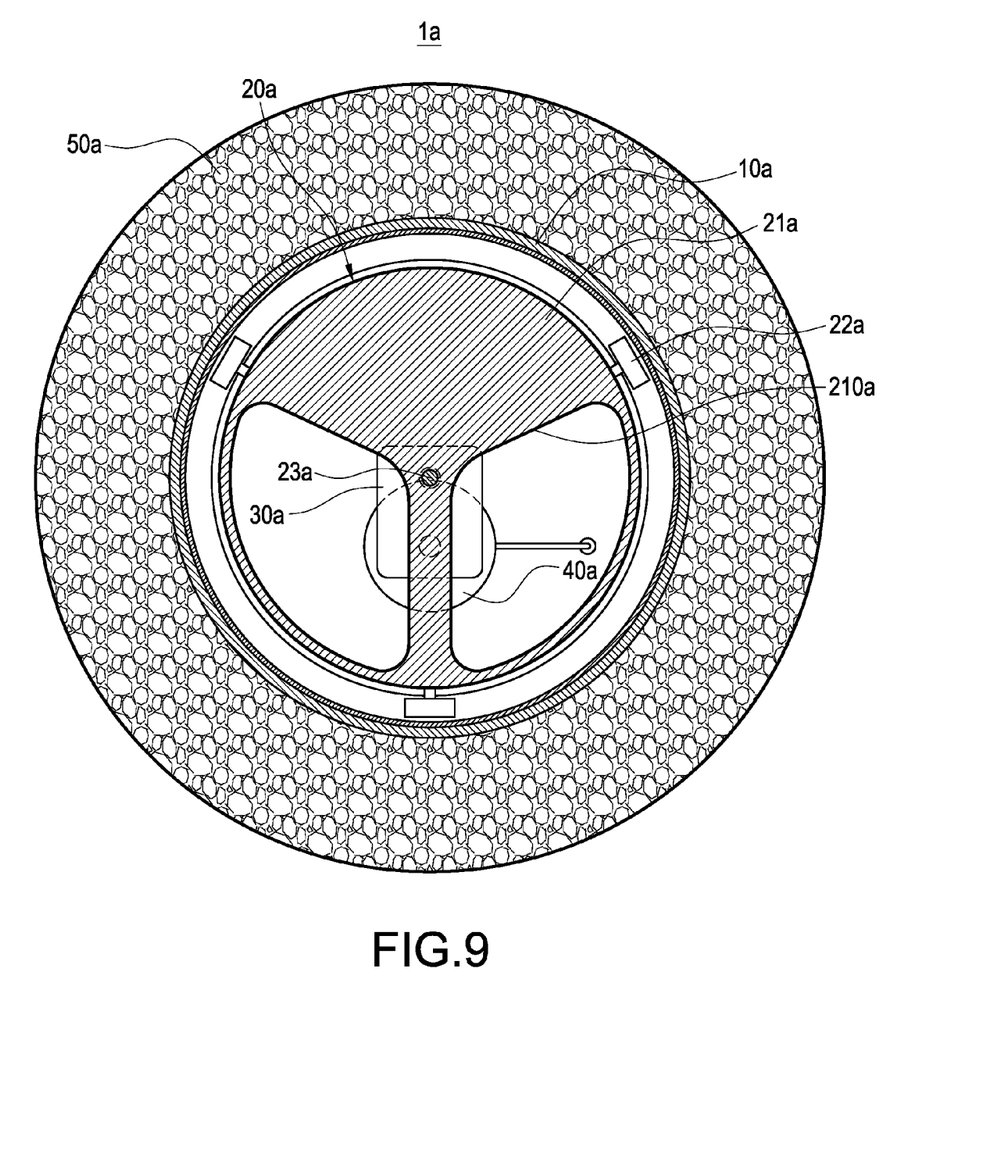
FIG. 9 is a power generation apparatus according to another embodiment of the present invention.

Also, please refer to FIG. 9, which is a power generation apparatus using wave energy conversion by gravity according to another embodiment of the present invention. In the current embodiment, which is similar to the previous embodiment, the power generation apparatus 1a comprises a sealed body 10a, a rotor 20a, a gear box 30a, a power generation motor 40a, and a pontoon 50a. The rotor 20a comprises an eccentric disk 21a, a plurality of roller 22a, and a rotating shaft 23a. However, compared with the previous embodiment, the current embodiment has the different eccentric disk 21a.

In the current embodiment, the eccentric disk 21a is a ring plate having at least one hollow portion (210a) and thus forms a biased configuration. In practice, the geometry of the eccentric disk 21a is not limited as long as it meets the requirement of a biased configuration.

The embodiments described above are only preferred ones of the present invention and not to limit the claimed scope of the present invention. Therefore, all the equivalent modifications and variations applying the spirit of the present invention should be embraced by the claimed scope of the present invention.

What is claimed is:

1. A power generation apparatus (1, 1a) using wave energy conversion by gravity, comprising:
    a sealed body (10, 10a) having a receiving space (100) in which a track (11) is disposed;
    a rotor (20, 20a) disposed in the receiving space (100) and comprising an eccentric disk (21, 21a), a plurality of rollers (22, 22a), and a rotating shaft (23, 23a), wherein a center of gravity of the eccentric disk (21, 21a) is disposed with an offset to that of the sealed body (10, 10a), wherein the rollers (22, 22a) are mounted to the eccentric disk (21, 21a) and disposed on the track (11), wherein the rotating shaft (23, 23a) penetrates through the eccentric disk (21, 21a);
    a gear box (30, 30a) comprising at least one gear shaft (31) driven by the rotating shaft (23, 23a) to rotate;
    a power generation motor (40, 40a) driven by the at least one gear shaft (31) to rotate and generate electric power; and
    a pontoon (50, 50a) mounted to the outside of the sealed body (10, 10a),
    wherein the track (11) has a ring shape and is disposed along an inner wall of the sealed body (10, 10a)
    wherein the track (11) comprises a first ring plate (111) and a second ring plate (112) opposite to the first ring plate (111), wherein both sides of the rollers (22, 22a) contact against the first ring plate (111) and the second ring plate (112), respectively, wherein the rollers (22, 22a) are disposed and can slide between the first ring plate (111) and the second ring plate (112).

2. The power generation apparatus (1, 1a) according to claim 1, wherein the gear box (30, 30a) and the power generation motor (40, 40a) are received on one side of the eccentric disk (21, 21a) in the receiving space (100).

3. The power generation apparatus (1, 1a) according to claim 1, further comprising at least one cable (60), one end of the at least one cable (60) being mounted to a bottom surface of the sealed body (10, 10a).

4. The power generation apparatus (1, 1a) according to claim 1, wherein the rollers (22, 22a) are spaced apart each other at the outer edge of the eccentric disk (21, 21a).

5. The power generation apparatus (1, 1a) according to claim 1, wherein the eccentric disk (21, 21a) is a ring plate having at least one hollow portion (210a).

6. A power generation apparatus (1, 1a) using wave energy conversion by gravity, comprising:
    a sealed body (10, 10a) having a receiving space (100) in which a track (11) is disposed;
    a rotor (20, 20a) disposed in the receiving space (100) and comprising an eccentric disk (21, 21a), a plurality of rollers (22, 22a), and a rotating shaft (23, 23a), wherein a center of gravity of the eccentric disk (21, 21a) is disposed with an offset to that of the sealed body (10, 10a), wherein the rollers (22, 22a) are mounted to the eccentric disk (21, 21*a*) and disposed on the track (11), wherein the rotating shaft (23, 23*a*) penetrates through the eccentric disk (21, 21*a*);

a gear box (30, 30*a*) comprising at least one gear shaft (31) driven by the rotating shaft (23, 23*a*) to rotate;

a power generation motor (40, 40*a*) driven by the at least one gear shaft (31) to rotate and generate electric power; and a pontoon (50, 50*a*) mounted to the outside of the sealed body (10, 10*a*), wherein the eccentric disk (21, 21*a*) has a hammer shape; wherein the eccentric disk (21, 21*a*) comprises a solid pate (211) and a strut (212) connected to the solid pate (211), wherein the rotating shaft (23, 23*a*) is disposed axially at the joint of the solid pate (211) and the strut (212).

\* \* \* \* \*